(12) United States Patent
Cooper

(10) Patent No.: US 7,266,710 B1
(45) Date of Patent: Sep. 4, 2007

(54) POWER THROTTLE CONTROLLER

(76) Inventor: Steve Cooper, 735 S. Vinewood St., Escondido, CA (US) 92029

( * ) Notice: Subject to any disclaimer, the term of this patent is extended or adjusted under 35 U.S.C. 154(b) by 1204 days.

(21) Appl. No.: 10/176,151

(22) Filed: Jun. 21, 2002

(51) Int. Cl.
*G06F 1/26* (2006.01)
*G06F 1/32* (2006.01)

(52) U.S. Cl. ........................ 713/320; 713/300
(58) Field of Classification Search ......... 713/300, 713/320
See application file for complete search history.

(56) References Cited

U.S. PATENT DOCUMENTS

| | | | |
|---|---|---|---|
| 5,586,332 A | 12/1996 | Jain et al. | |
| 5,719,800 A | 2/1998 | Mittal et al. | |
| 5,951,689 A | 9/1999 | Evoy et al. | |
| 5,953,237 A * | 9/1999 | Indermaur et al. | 713/321 |
| 6,304,978 B1 | 10/2001 | Horigan et al. | |
| 6,688,965 B1 * | 2/2004 | Crippen et al. | 454/184 |
| 6,711,613 B1 * | 3/2004 | Ewing et al. | 709/223 |
| 6,725,385 B1 * | 4/2004 | Chu et al. | 713/323 |

* cited by examiner

*Primary Examiner*—Rehana Perveen
*Assistant Examiner*—Anand B. Patel
(74) *Attorney, Agent, or Firm*—Patent & Trademark Services, Inc; Joseph H. McGlynn

(57) ABSTRACT

A power controller which is installed on each of a plurality of blades in a blade style server computer. Each power controller determines whether the blade it is on can go to a higher power mode without a command from a centralized controller.

4 Claims, 1 Drawing Sheet

POWER THROTTLE CONTROLLER

BACKGROUND OF THE INVENTION

This invention relates, in general, to controllers for blade server computers, and, in particular, to a controller which determines how many of the CPU boards can be operating at their high power mode simultaneously.

DESCRIPTION OF THE PRIOR ART

In the prior art various types of control devices have been proposed. For example, U.S. Pat. No. 6,304,978 to Horigan et al discloses a component with a processing circuit to receive a throttling signal that throttles the operation of the electronic component.

U.S. Pat. No. 5,951,689 to Evoy et al discloses a power control system for a microprocessor with multiple execution units and the system disables some of the units to conserve power.

U.S. Pat. No. 5,719,800 to Mittal et al discloses an integrated circuit which throttles the performance of certain units to conserve power.

U.S. Pat. No. 5,586,332 to Jain et al discloses a clock throttling mechanism which turns off certain processor components to minimize power consumption.

SUMMARY OF THE INVENTION

The present invention is directed to a power controller which is installed on each of a plurality of blades in a blade style server computer. Each power controller determines whether the blade it is on can go to a higher power mode without a command from a centralized controller.

It is an object of the present invention to provide a new and improved power throttle controller for a blade style server computer.

It is an object of the present invention to provide a new and improved power throttle controller for a blade style server computer in which the controller is mounted on each blade in the blade style computer.

It is an object of the present invention to provide a new and improved power throttle controller for a blade style server computer which allows hot swapping of the blades.

These and other objects and advantages of the present invention will be fully apparent from the following description, when taken in connection with the annexed drawings.

DESCRIPTION OF THE PREFERRED EMBODIMENT

Figure 1:
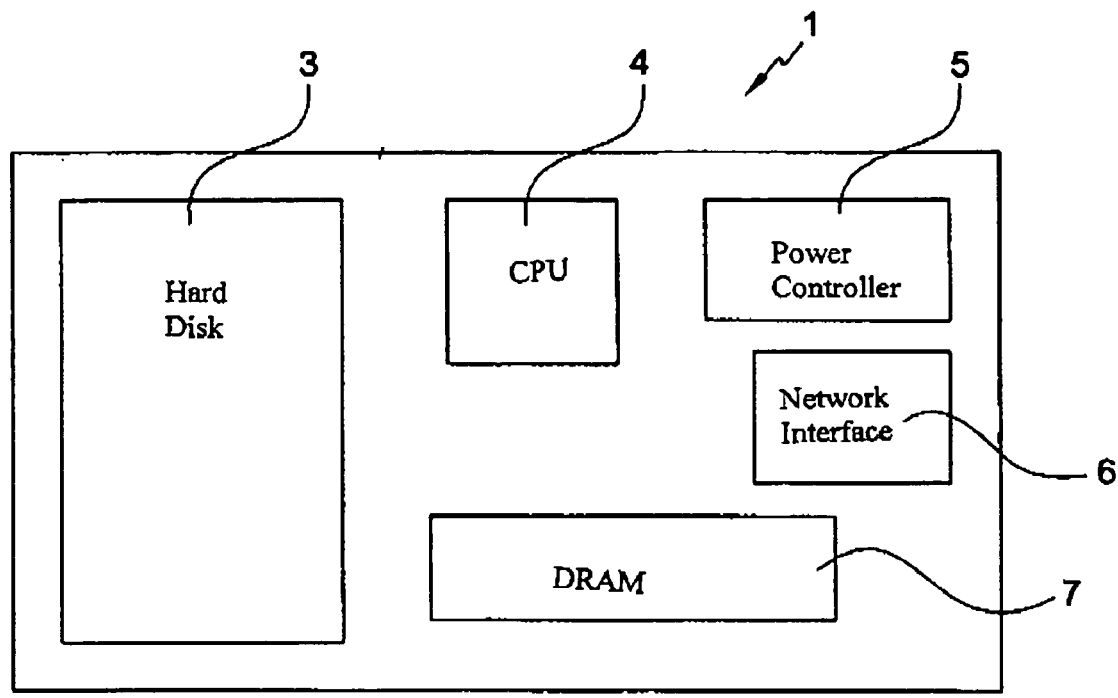
FIG. 1 is schematic view of one of the blades of the present invention.

Referring now to the drawings in greater detail, FIG. 1 shows a schematic view of one of the blades 1 in a blade style server. In blade style servers utilizing a maximum number of blades or CPU boards with a system is critical. A controller is used to determine how many of the blades can be operating at their high power mode.

Modern CPU's have the ability to dynamically switch between a higher and lower operating frequency. At a higher operating frequency, the CPU can perform more tasks in the same amount of time, however this requires more power and produces more heat, which can damage computer components. Therefore, it is desirable to have the components operate in high power mode only when necessary.

The present invention takes advantage of the modern computer ability to dynamically switch between a higher and lower operating frequency in order to determine how many of the total blade server CPU's are simultaneously running at high power.

FIG. 1 shows a blade 1 used in the present invention. The blade 1 has a hard disk 3, a CPU 4, a network interface 6 and DRAM 7 mounted thereon. These elements are conventional and therefore, no further explanation is necessary. In addition to the above mentioned components, each blade 1 has a power controller 5 mounted on the blade.

All CPU blades are designed to initially power up in their low power mode to conserve power and produce less heat. In order to switch to a higher power mode, the blade must receive a grant signal from a controller. The present invention places a controller 5 on each blade 1, and each controller self determines whether its blade can go into a high power mode. This self-determining attribute is critical since it prevents a single point of failure that could affect a central controller that controls all of the blades. Self determination also preserves the ability of each blade to be hot swapped (i.e. inserted or removed form the server without turning off the power to the server).

Figure 2:
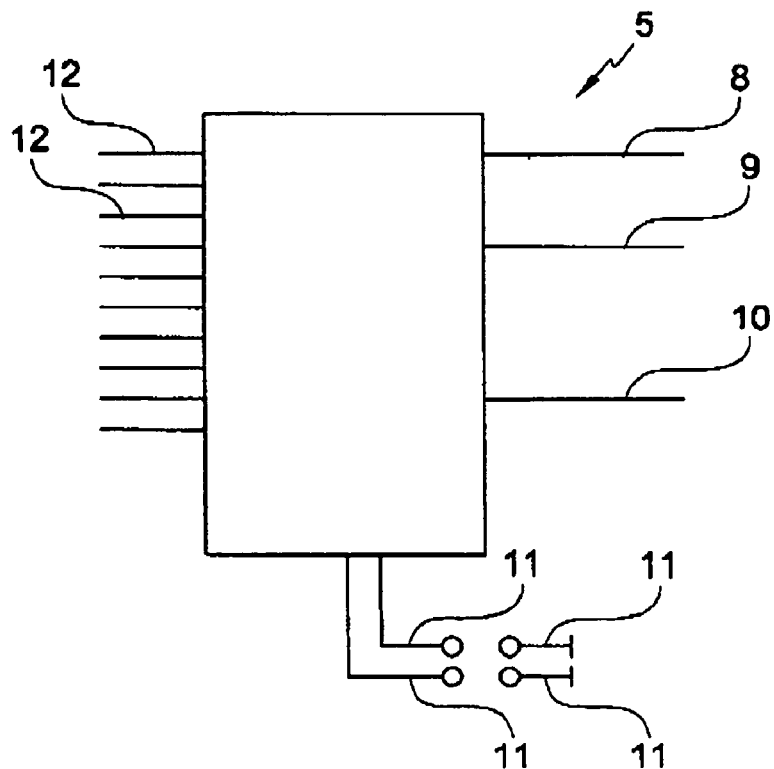
FIG. 2 is a schematic view of the controller of the present invention.

As shown in FIG. 2, each power controller 5 has a plurality of inputs 12 from the other blades in the server. These inputs tell the controller 5 whether the other blades in the server are at high or low power. When the CPU determines a higher power status is preferred, it sends a request to the controller 5 at 8. The controller then determines the status of the other blades based on the inputs from 12. If there is enough power available for the blade 1 to go to a higher power state, the controller 5 sends a grant signal at 9.

The controller 5 sends a power status (higher or lower) to the other CPU blades via the system back plane at 10. If CPU blade isn't installed in the server, its power status shows up as low power. Shown at the bottom of FIG. 2 is a plurality of jumper or switch inputs 11. By providing jumpers across these points 11 the user can select how many CPU's in a group can be at full power simultaneously. A typical jumper setting allows five out of ten CPU blades to operate at higher power Although the Power Throttle Controller and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A system for controlling the number of blade server computers that can operate at high power mode, said system comprising:

at least two computers, each computer having a CPU and a power controller, each power controller having means for receiving power signals from another computer, said power signals informing each power controller how many other computers are operating in high power mode, each power controller having means for sending a power status to other computers, each power controller having means for switching each computer to high power mode.

2. The system as claimed in claim 1, wherein each power controller is self determining with respect to whether each power controller can switch to high power mode.

3. A system for controlling the number of blade server computers that can operate at high power mode, said system comprising:

at least two computers, each computer having a CPU and a power controller, each power controller having means for receiving power signals from another computer, said power signals informing each power controller how many other computers are operating in high power mode, each power controller having means for sending a power status to other computers, each power controller having means for switching each computer to high power mode, and wherein each power controller has means for limiting the number of computers which can operate at full power mode.

4. The system as claimed in claim 3, wherein means for limiting the number of computers which can operate at full power mode are jumpers.

* * * * *